United States Patent Office 2,905,739
Patented Sept. 22, 1959

2,905,739

ALKALINE STORAGE BATTERY

Howard J. Strauss, Elkins Park, Pa., assignor to The Electric Storage Battery Company, a corporation of New Jersey No Drawing. Application September 10, 1956
Serial No. 608,675

5 Claims. (Cl. 136—6)

The invention relates to alkaline storage batteries of the type containing positive active material of a nickel oxide and negative active material of metallic cadmium and, more particularly, to such batteries that are sealed against the passage of gases either to or from the atmosphere surrounding the battery.

It has, of course, heretofore been proposed to seal these batteries to prevent contamination of the electrolyte, generally a solution of potassium hydroxide, by the carbon dioxide from the atmosphere, and to prevent depletion of the electrolyte by the escape of hydrogen and oxygen from the cell, the water in the electrolyte being disassociated into these gases by reason of a charging current.

It must be understood that since storage batteries are composed of a plurality of cells, and since a number of bateries may be used in series for certain purposes, it is customary to subject these batteries to a certain period of overcharge to insure that the weaker cells or batteries are completely recharged at the end of that phase of the discharge-recharge cycle. In the prior art constructions, it has been found that, during charge and particularly during overcharge, oxygen is given off at the positive plate (anode) and hydrogen at the negative plate (cathode). Furthermore, and by reason of the fact that the weaker cells or batteries may reach the end of discharge while the remaining cells or batteries still retain useful discharge capacity, it is possible that the former may be subjected to a period of overdischarge i.e. reversal. In this situation, and since the positive plate now functions as a cathode, hydrogen is given off at that plate. At the negative plate, now acting as an anode, oxygen is evolved. As a result of past experience it is known that the combination of oxygen with the metallic cadmium active material of the negative plate will readily occur thereby rapidly converting the metallic cadmium to cadmium oxide. Conversely, any reaction between hydrogen gas and the active material of the positive plate, generally felt to be one of the higher oxides of nickel, is relatively slow. Accordingly, and to maintain the battery on the "oxygen cycle" there has generally been supplied an exces of negative active material to insure that such plates would never reach a fully charged condition, with subsequent evolution of hydrogen gas, prior to the point at which the positive plates will go into overcharge, with resultant evolution of oxygen. At this latter point, the evolved oxygen will react with the already charged negative active material (metallic cadmium) and set up a dynamic balance with the influence of the charging current whereby further charge of the negative plates will be prevented i.e. the tendency of oxygen and cadmium to react to form cadmium oxide will exactly balance the conversion of cadmium oxide to metallic cadmium by the charging current.

It has been found, however, that this imbalance of active material capacity in favor of the negative plates may not persist throughout the life of the cell by reason of the fact that a cadmium negative plate tends to lose capacity when the battery is cycled. Thus, after a period of service, the relationship of the plates may be such that the negative will go into overcharge before the positive is fully charged thereby giving rise to large and disruptive quantities of hydrogen.

It is an object of the invention, therefore, to provide a sealed storage battery of the nickel-cadmium type that is so constructed as to completely suppress the evolution of hydrogen gas regardless of the ratios of active material contained in the positive and negative plates of the battery.

The invention comprises the addition to the 20% to 45% solution by weight of alkaline electrolyte, generally a solution of about 30% by weight potassium hydroxide, of a metallic substance that is readily soluble in the electrolyte and yet can be plated out of the solution under the influence of the charging current. For example, zinc oxide, zinc hydroxide, and metallic zinc are extremely useful to produce the desired result. A sufficient quantity of the additive may be used to approximately saturate the electrolyte. If, for purposes of illustration, we use zinc oxide as illustrative of the additive and a 30% potassium hydroxide solution as the electrolyte, a saturated solution would contain approximately 3.5% by weight of the zinc oxide. If used in amounts between about 2.5% and about 4% by weight of the electrolyte, the additive will have optimum effect for the purposes of this invention.

The following discussion is illustrative of the functioning of the invention. With the soluble material added to the electrolyte, the cell is charged to the point at which the negative plates would ordinarily go into overcharge with resultant evolution of hydrogen gas. Due to the presence of the additive, however, a reaction i.e. the plating out of metallic zinc on the negative plate, is established preferential to the evolution of the hydrogen by reason of the fact that the voltage required for the plating reaction is less than that required for hydrogen evolution. Thus, the cell voltage at which hydrogen will be evolved when the negative is a true cadmium electrode is about 1.55 volts while the plating of the zinc occurs at a voltage of 1.50 volts.

In accordance with the present invention, the electrolyte is inhibited as by close spacing of the positive and negative plates and by the presence of a minimum amount of free electrolyte, both of which features are conventional in sealed battery constructions, the zinc will deposit on the negative in the form of a mossy structure or "tree." As the period of overcharge is continued, the zinc "trees" will grow and extend through the pores of the customary permeable separator which in practice will vary from between about 0.001 inch to 0.015 inch in thickness, and build up a metallic path or short circuit between the positive and negative plates. Once a tree has been established, any additional overcharge current will pass through the short circuiting "tree" and inhibit the evolution of hydrogen. It will be understood that, immediately upon termination of the charge current, the "tree" will immediately be broken as by oxidation of the metallic zinc at the positive plate or by local action between the zinc and the cadmium at the negative plate. In any event, the existence of the "tree" after the cut off of the charge current is so momentary that the short circuit will not cause any noticeable decrease in capacity.

A similar occurrence will take place upon overdischarge i.e. reversal of the sealed cell. In this situation, since the positive plate acts as the cathode, the zinc will be plated out upon that plate and the short circuiting "tree" will grow from the positive plate to the negative plate, the latter now functioning as an anode.

It will be seen, therefore, that I have achieved the object of my invention, namely, to construct a sealed cell in which the evolution of hydrogen gas is completely suppressed.

Other forms and variations of the invention coming within the scope of the appended claims will readily suggest themselves to those skilled in the art.

I claim:

1. A method of suppressing the evolution of hydrogen gas resulting from overcharge of the negative plates and from overdischarge of the positive plates of a sealed nickel cadmium battery having permeable separators and containing a minimum of free alkaline electrolyte, which comprises dissolving into the electrolyte, in an amount sufficient to approximately saturate the electrolyte a soluble substance selected from the group consisting of zinc, zinc oxide, and zinc hydroxide.

2. A sealed storage battery having a positive plate with active material of nickel oxide, a negative plate with active material of metallic cadmium, a permeable separator between said plates, and a minimum of free alkaline electrolyte including a soluble substance selected from the group consisting of zinc, zinc oxide and zinc hydroxide in an amount of about 2.5% to 4% by weight of dissolved zinc in the completed electrolyte.

3. A sealed storage battery according to claim 2 wherein said electrolyte is saturated with said soluble substance selected from the group consisting of zinc, zinc oxide and zinc hydroxide.

4. A method of suppressing the evolution of hydrogen gas resulting from overcharge of the negative plates of a sealed nickel cadmium battery having permeable separators and containing a minimum amount of free alkaline electrolyte, which comprises the steps of adding to the electrolyte a soluble metallic substance selected from the group consisting of zinc, zinc oxide and zinc hydroxide in an amount of about 2.5% to 4% by weight of dissolved zinc in the completed electrolyte, charging said battery by converting the negative plates from cadmium oxide to metallic cadmium and after said negative plates have been completely converted to metallic cadmium, establishing a zinc plating reaction on said negative plates preferential to the hydrogen evolution reaction sufficient to create a temporary short circuit between said negative plates and said positive plates under conditions of overcharge.

5. A method of suppressing the evolution of hydrogen gas resulting from overdischarge of the positive plates of a sealed nickel cadmium battery having permeable separators and containing a minimum amount of free alkaline electrolyte, which comprises the steps of adding to the electrolyte a soluble metallic substance selected from the group consisting of zinc, zinc oxide and zinc hydroxide in an amount of about 2.5% to 4% by weight of dissolved zinc in the completed electrolyte, and after discharge of said positive plates, establishing a zinc plating reaction on said positive plates preferential to the hydrogen evolution reaction sufficient to create a temporary short circuit between said negative plates and said positive plates under conditions of overdischarge.

References Cited in the file of this patent

UNITED STATES PATENTS

| | | |
|---|---|---|
| 1,955,115 | Drumm | Apr. 17, 1934 |
| 2,611,792 | Andre | Sept. 23, 1952 |
| 2,651,669 | Neumann | Sept. 8, 1953 |
| 2,714,624 | Sayas Costa et al. | Aug. 2, 1955 |